(12) United States Patent
Maeda et al.

(10) Patent No.: US 6,594,091 B2
(45) Date of Patent: Jul. 15, 2003

(54) OPTICAL PICKUP

(75) Inventors: Takanori Maeda, Tsurugashima (JP); Ikuya Kikuchi, Tsurugashima (JP); Katsuhiro Koike, Tsurugashima (JP); Makoto Sato, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/999,195

(22) Filed: Dec. 3, 2001

(65) Prior Publication Data

US 2002/0067553 A1 Jun. 6, 2002

(30) Foreign Application Priority Data

Dec. 5, 2000 (JP) ........................................ 2000-369948

(51) Int. Cl.[7] .............................. G02B 13/18; G02B 3/02
(52) U.S. Cl. .................. 359/719; 359/740; 369/112.12; 369/112.23
(58) Field of Search ................................ 359/719, 740; 369/112.12, 112.23

(56) References Cited

U.S. PATENT DOCUMENTS

RE37,717 E * 5/2002 Eguchi et al. .............. 359/739

* cited by examiner

Primary Examiner—Hung Xuan Dang
Assistant Examiner—Tuyen Tra
(74) Attorney, Agent, or Firm—Morgan, Lewis & Bockius LLP

(57) ABSTRACT

The present invention relates to an optical pickup having a constant numerical aperture even if spherical aberration is compensated for. The optical pickup is used in an information recording and/or reproducing machine. The information recording and/or reproducing machine records and/or reproduces information in a recording medium upon radiation of a light beam from a light source. The optical pickup includes a condensing optical system for condensing the light beam from the light source onto a recording layer of the recording medium. The condensing optical system includes an object lens. The condensing optical system also includes an aperture positioned about a focal length of the object lens apart from a position of a principal incidence plane of the object lens toward the light source along an optical axis of the condensing optical system.

9 Claims, 7 Drawing Sheets

OPTICAL PICKUP

BACKGROUND OF THE INVENTION

1. Field of the Invention

The present invention relates to an optical pickup for use in an apparatus adapted to record and/or reproduce information by radiating a convergent light beam to a recording layer of an optical information recording medium such as an optical disc which records the information on tracks, and more specifically to an optical system of such an optical pickup.

2. Description of the Related Art

In recent times, optical discs have been in wide use as means for recording/reproducing various data including video data, audio data and computer data. High density recordation type optical discs referred to as DVDs (Digital Versatile Disc), for example, are commercially available.

In a next generation optical disc system designed to increase a recording capacity, use of an optical disc recorded at an even higher density than the DVD together with an object lens having a numerical aperture NA as high as 0.85 in an optical pickup is suggested.

An optical disc has a light-transmissive cover layer as the outermost layer. The optical disc has one or more recording layers below the cover layer. If the numerical aperture of an object lens is increased, and the thickness of the cover layer to transmit light during an information recording/reproducing operation is deviated from a reference value, large spherical aberration results, and the spatial frequency characteristic (MTF) of the lens as expected cannot be achieved. When information is recorded/reproduced into/from short marks or pits in particular, unevenness in the cover layer thickness could increase an amount of jitter.

In order to solve the above described disadvantage, a beam expander which includes two lenses and servers as an optical device for correcting spherical aberration may be located between a light source and the object lens, so that the spherical aberration could be corrected. The beam expander converts a parallel light beam to a convergent or divergent light beam, and the resulting convergent or divergent beam is incident to the object lens. As a result, spherical aberration is included in a light emitted from the object lens. This spherical aberration compensates for another spherical aberration caused at the cover layer. If the cover layer thickness equals a reference value, the beam expander is operated to let out an incident parallel light beam as parallel, and slightly changes a light beam diameter. If the object lens is designed such that the spherical aberration caused at the object lens and the spherical aberration caused at the cover layer having the reference thickness just cancel each other, no spherical aberration is caused at a spot formed by a convergent light passing through the cover layer. If the thickness of the-cover layer is deviated from the reference value, the beam expander converts the parallel beam to a divergent or convergent beam. Specifically, if the cover layer is thinner than the reference thickness, the expander causes a convergent beam to be incident to the object lens. This increases an amount of spherical aberration caused at the object lens. The increased spherical aberration cancels a reduced amount of spherical aberration caused at the cover layer. A less amount of spherical aberration occurs at the cover layer because of the smaller cover layer thickness. Thus, there is no aberration on the information recording layer. Appropriate compensation is accordingly made.

Figure 1:
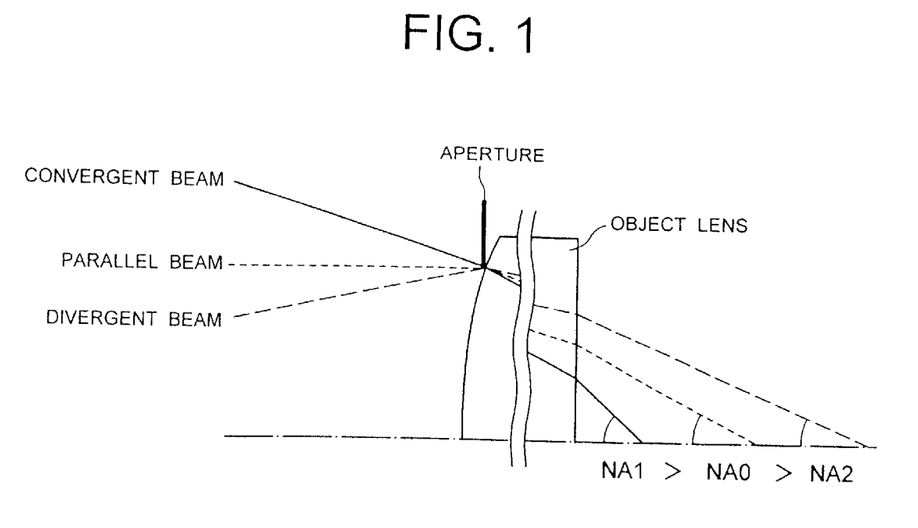
FIG. 1 illustrates a sectional view of major parts in an optical system of an optical pickup according to the prior art.

FIG. 1 of the accompanying drawings illustrates a conventional optical pickup. When the spherical aberration is corrected with an optical system having an aperture located at an entrance pupil of the object lens as shown in FIG. 1, and a convergent (or divergent) beam is incident to the object lens, an emergent beam focuses at a position ahead of (or behind) the focal position of the object lens, so that the numerical aperture on the recording layer increases (or decreases). In other words, the numerical aperture fluctuates (NA1>NA0>NA2) on the recording layer as a result of the spherical aberration compensation. As the numerical aperture NA increases, the MTF expands to a level beyond the signal bandwidth, which increases noises in the signal. As the numerical aperture NA decreases, the MTF bandwidth necessary for reproducing the signal is not obtained, and a drop in the signal modulation factor degrades the SN ratio of the reproduced signal.

SUMMARY OF THE INVENTION

It is an object of the present invention to provide an optical pickup including an optical system that restricts or prevents changes in a numerical aperture on a recording layer even if spherical aberration is compensated for.

According to one aspect of the present invention, there is provided an optical pickup for use in an information recording and/or reproducing apparatus, comprising a condensing optical system having an object lens for condensing a light beam radiated from a light source on a recording layer of an information recording medium and an aperture positioned between the light source and the object lens. The apparatus records/reproduces information by radiation of the light beam condensed on the recording layer of the information recording medium. The aperture is positioned about the focal length of the object lens apart from the position of the principal incidence plane of the object lens toward the light source along an optical axis of the condensing optical system.

The condensing optical system may include an optical system capable of varying a light beam condensing position to correct spherical aberration by converting the light beam into a convergent or divergent beam and directing the beam to the aperture.

DETAILED DESCRIPTION OF THE INVENTION

Figure 2:
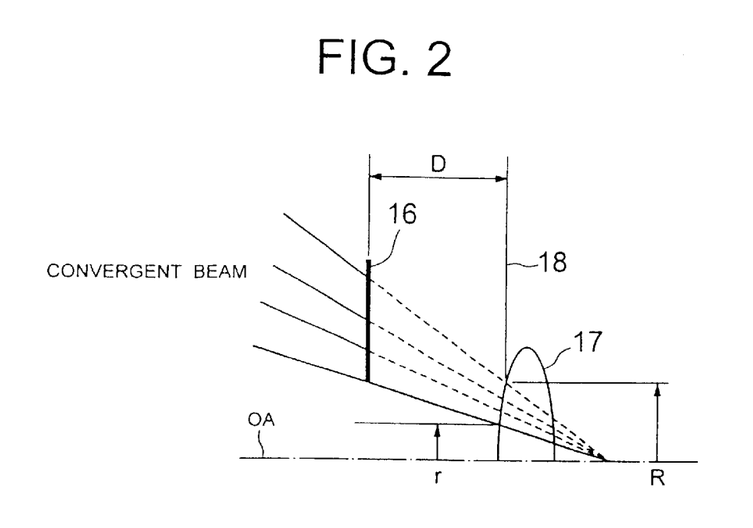
FIG. 2 illustrates a schematic sectional view of major parts in an optical system of an optical pickup according to the present invention.

Fluctuation of the numerical aperture is first discussed in reference to FIGS. 1 and 2. As shown in FIG. 1, if a restricted convergent light beam passes through an aperture having a large diameter opening on the plane of incidence of an object lens in the conventional optical system, the numerical aperture increases on the recording layer of the optical disc as the focal point position is shifted towards the object lens. Specifically, the numerical aperture increases from NA0 to NA1 upon compensation of spherical aberration. This is because the diameter of the light beam incident to the object lens is constant at the principal incidence plane of the object lens regardless of the incident beam being a parallel beam or a convergent beam as understood from FIG. 1.

In contrast, according to the present invention, as shown in FIG. 2, the aperture 16 is relocated toward a light source (to the left in the drawing) a prescribed distance D from the position of the principal incidence plane 18 of the object lens 17. The aperture 16 has a circular opening in rotation symmetry with respect to the optical axis OA. When the position of the aperture 16 is shifted toward the light source from the incidence plane 18 of the object lens 17, the diameter r of the incident convergent beam becomes smaller than the beam diameter R of the incident parallel beam on the incidence plane 18 because of the convergence caused by the offset distance D between the incidence plane 18 and the aperture 16. In other words, the numerical aperture is limited by the aperture 16. The decrease in the incident beam diameter from R to r caused by the distance D is cancelled by the increase in the numerical aperture (NA1 in FIG. 1) of the light beam on the recording layer caused by the incidence of the converged light beam, so that the numerical aperture is maintained to be constant even if the spherical aberration is compensated for.

Now, an optical pickup according to an embodiment of the present invention will be described in detail in conjunction with FIGS. 3 to 10.

Figure 3:
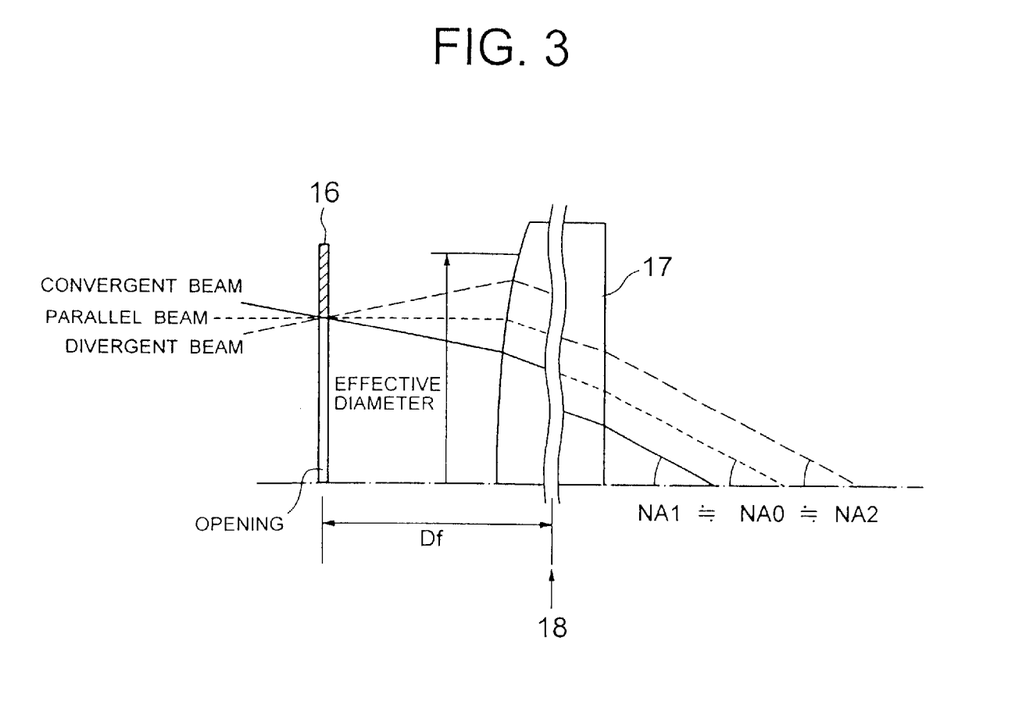
FIG. 3 illustrates a sectional view of major parts in an optical system of an optical pickup according to an embodiment of the present invention.

Referring to FIG. 3, the aperture 16 is positioned about the focal length Df of the object lens apart from the position of the incidence plane 18 toward the light source. As shown, if a beam expander of the optical pickup corrects the spherical aberration and a convergent beam (or divergent beam) resulting from the compensation of the spherical aberration is incident to the object lens 17, the numerical aperture on the recording layer is unchanged by the function of the aperture 16 (NA1≈NA0≈NA2). As a result, the MTF characteristic is stabilized. It should be noted that the MTF characteristic will change if the numerical aperture NA changes. The effective diameter of the object lens 17 is larger than the opening diameter of the aperture 16 in order to secure a necessary quantity of light. Although the beam expander that can change a converging position is used as spherical aberration correction means in this embodiment, other types of optical system that can adjust a converging position can be used.

Figure 4:
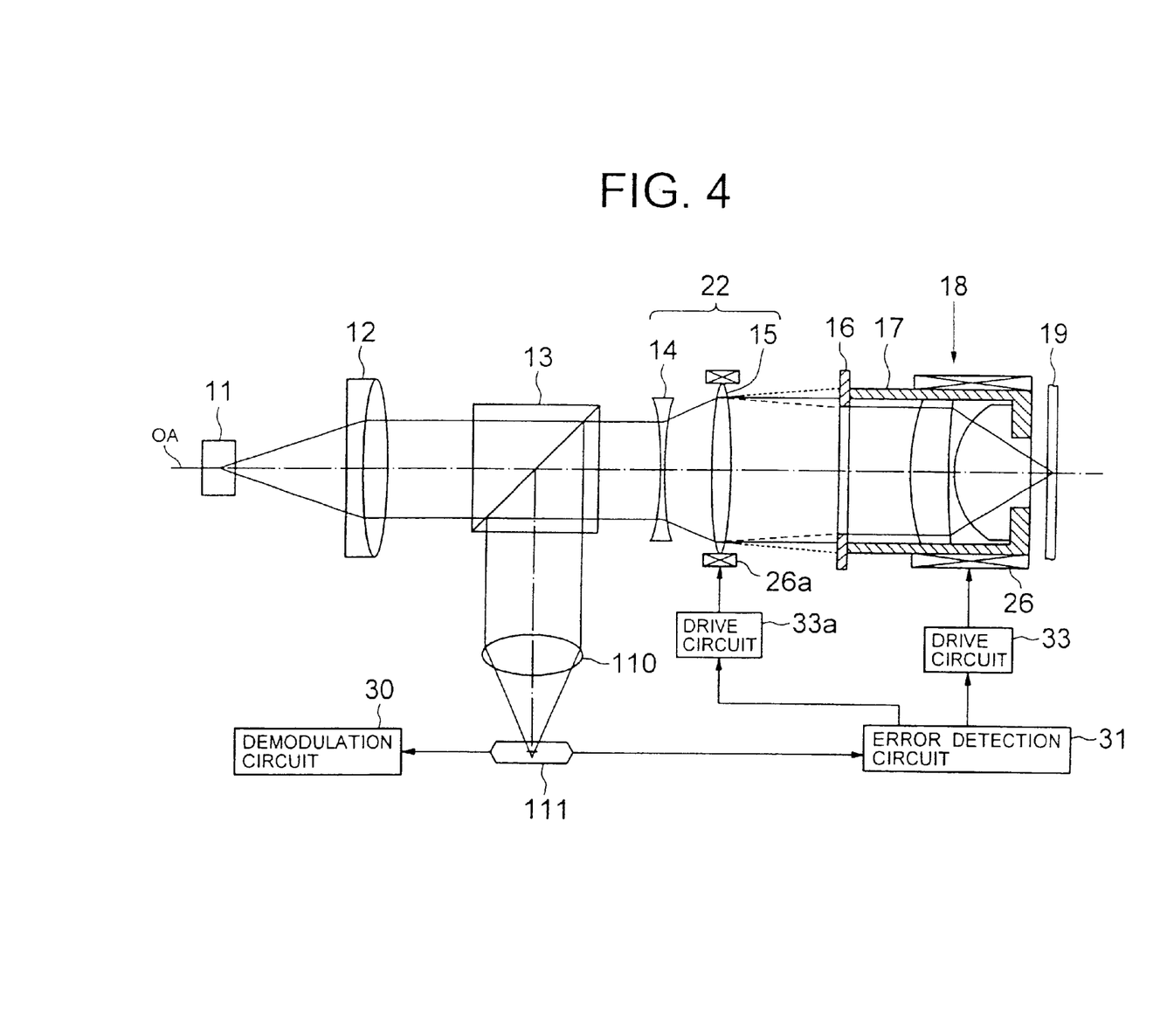
FIG. 4 illustrates a schematic block diagram of an optical system of an optical pickup in an information recording/reproducing apparatus according to one embodiment of the present invention.

FIG. 4 is a schematic diagram of an optical system of an optical pickup in an information recording/reproducing apparatus for an optical disc according to the present invention. The optical pickup in the information recording/reproducing apparatus includes a blue semiconductor laser 11 which emits a blue beam having a short wavelength in the range from about 400 nm to about 415 nm, preferably about 405 nm. The optical pickup also includes a collimator lens 12, a polarized beam splitter 13, a beam expander 22 having a first lens 14 and a second lens 15, an aperture 16 having an opening, and a two-group object lens unit 17 having two lenses. In the optical system, a divergent light beam from the semiconductor laser (i.e., light source) 11 is converted into a parallel beam by the collimator lens 12, transmitted through the polarized beam splitter 13 and converged to the optical disc 19 by the object lens unit 17. The optical disc 19 is placed such that a recording layer of the optical disc 19 is positioned in the vicinity of the focal point of the object lens unit 17. The beam thus forms light spots on a series of pits on the information recording plane of the optical disc 19. The reference numeral 18 designates the position of the principal plane of the object lens on the incidence side. The beam expander 22 drives the two lenses 14 and 15 to move apart from each other along the optical axis OA of the beam expander in order to convert a parallel light beam to a convergent beam so that the resulting convergent beam is incident to the object lens. Conversely, the beam expander 22 causes the lenses 14 and 15 to move toward each other in order to convert the parallel beam to a divergent beam. In this manner, the wave front is controlled to generate spherical aberration, which cancels spherical aberration generated at the cover layer of the optical disc 19. Although the two-group object lens unit 17 is used as the object lens in the foregoing description, the term "object lens" could include all lenses (group(s) of lenses) between the aperture 16 and the optical disc 19. The "object lens" may only include a single lens or a plurality of lenses. Since a focal length is determined by all the lenses between the aperture 16 and the optical disc 19, the position of the aperture 16 is determined based on the focal length of the "object lens" 17.

In addition to the light radiation optical system described above, the optical pickup has a photodetecting optical system including a detection lens. The object lens unit 17 and the polarized beam splitter 13 are also used in the photodetecting optical system. Using the photodetecting optical system, a light reflected from the optical disc 19 is collected by the object lens unit 17 and directed to a condenser lens 110 by the polarized beam splitter 13. A convergent beam from the condenser lens 110 is passed through an astigmatism generating element such as a cylindrical lens and a multi-lens (not shown) and forms a light spot in the vicinity of the center of the light receiving plane 111 of a photodetector.

The photodetector having the light receiving plane 111 is connected to a demodulation circuit 30 and an error detection circuit 31. The error detection circuit 31 is connected to a driving circuit 33 to drive a mechanism including an actuator 26 for tracking and focus control for the object lens unit and another driving circuit 33a to drive a mechanism including an actuator 26a for controlling the distance between the first and second lenses 14 and 15 of the beam expander on the optical axis.

The photodetector supplies the demodulation circuit 30 and the error detection circuit 31 with an electrical signal based on an image of a light spot formed in the vicinity of the center of the light receiving plane 111. The demodulation circuit 30 generates a recording signal based on the electrical signal. The error detection circuit 31 generates various signals, such as a focus error signal, a tracking error signal, a spherical aberration error signal and a servo signal, based on the electrical signal and supplies drive signals to the actuators through the drive circuits 33 and 33a of the actuators. The actuators servo-control and drive the object lens unit 17, the beam expander 22 and the like in response to the drive signals.

The reproducing operation by the optical pickup according to the embodiment will be now described. A parallel beam transmitted through the polarized beam splitter 13 is converted into a beam, diverged in accordance with the beam expander magnification, by the first lens 14 of the beam expander 22. The beam expander second lens 15 is adapted to move on the optical axis OA in response to the spherical aberration error signal to compensate for the aberration of the diverged beam. Accordingly, a parallel beam or an aberration-compensated converged or diverged beam emerges from the second lens 15 and is incident to the object lens unit 17 through the aperture 16.

It should be assumed here that a reference thickness of the cover layer of the optical disc 19 is for example 100 $\mu$m, an object lens unit having a numerical aperture of 0.85 is used for the optical system, and the optical system is designed such that an incident light beam parallel to the object lens unit 17 forms a spot on the optical disc 19 with no aberration under designed conditions. If the cover layer thickness of the optical disc 19 is equal to the reference thickness (100 $\mu$m), the beam expander second lens 15 emits a parallel beam to the object lens unit 17 as shown in FIG. 5.

Figure 5:
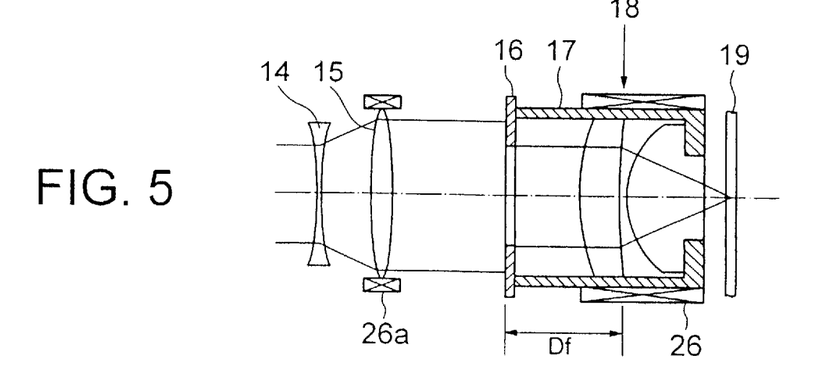
FIG. 5 illustrates an enlarged sectional view of a beam expander, an object lens unit and neighboring parts in the optical system of the optical pickup shown in FIG. 4.
Figure 6:
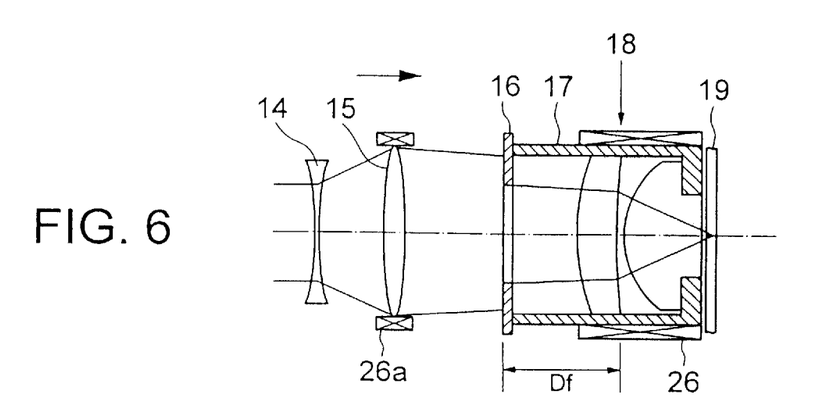
FIG. 6 is a cross sectional view similar to FIG. 5 but illustrates when a second lens of the beam expander is moved away from a light source.
Figure 7:
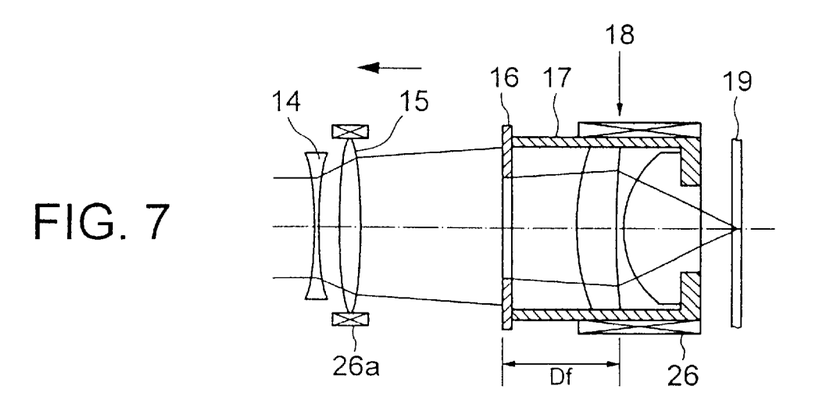
FIG. 7 is also similar to FIG. 5 but illustrates when the second lens of the beam expander is moved toward the light source.
Figure 8:
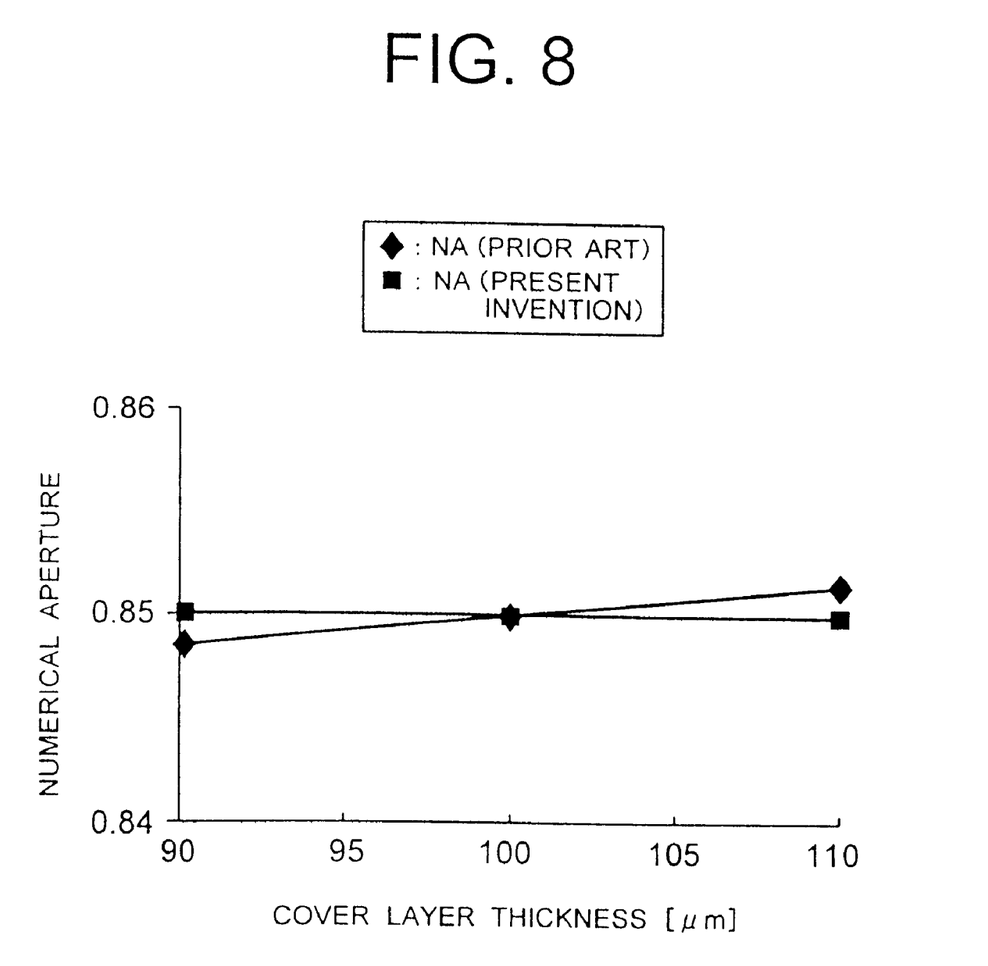
FIG. 8 is a graph showing changes in a numerical aperture of a light beam on a recording layer of an optical disc relative to the thickness of a cover layer of the optical disc.

Referring to FIG. 6, if the cover layer is thinner than the reference thickness, the beam expander second lens 15 is moved from the position shown in FIG. 5 apart from the light source (to the right in the drawing), so that the converged beam is incident to the position of the principal incidence plane 18 of the object lens. Thus, an increased amount of spherical aberration is generated at the object lens unit 17. The increased spherical aberration compensates for a reduction in the spherical aberration generated at the thinner cover layer. Less spherical aberration occurs if the thickness of the cover layer is reduced. Referring to FIG. 7, if the cover layer has a thickness larger than the reference value, the beam expander second lens 15 is moved toward the light source from the position shown in FIG. 5, so that a divergent beam is incident to the position of the principal incidence plane 18 of the object lens. The increase in the spherical aberration at the thicker cover layer is compensated for accordingly.

Changes in the numerical aperture on the recording layer when the thickness of the cover layer of the optical disc 19 varies ±10 $\mu$m from the reference thickness of 100 $\mu$m were measured for the optical system of the illustrated embodiment and the optical system according to the prior art shown in FIG. 1. The results are given in FIG. 8. It was confirmed that the numerical aperture less fluctuates in the case of the optical pickup according to the embodiment than in the conventional case shown in FIG. 1.

Figure 9:
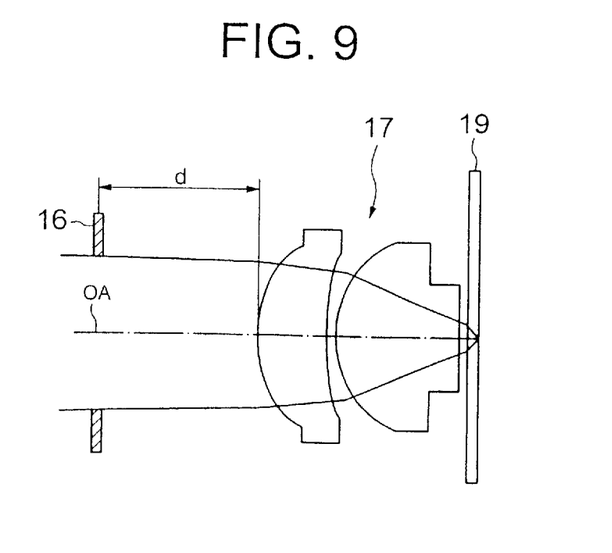
FIG. 9 is a schematic partial sectional view of an optical system in an optical pickup according to the embodiment of the present invention.
Figure 10:
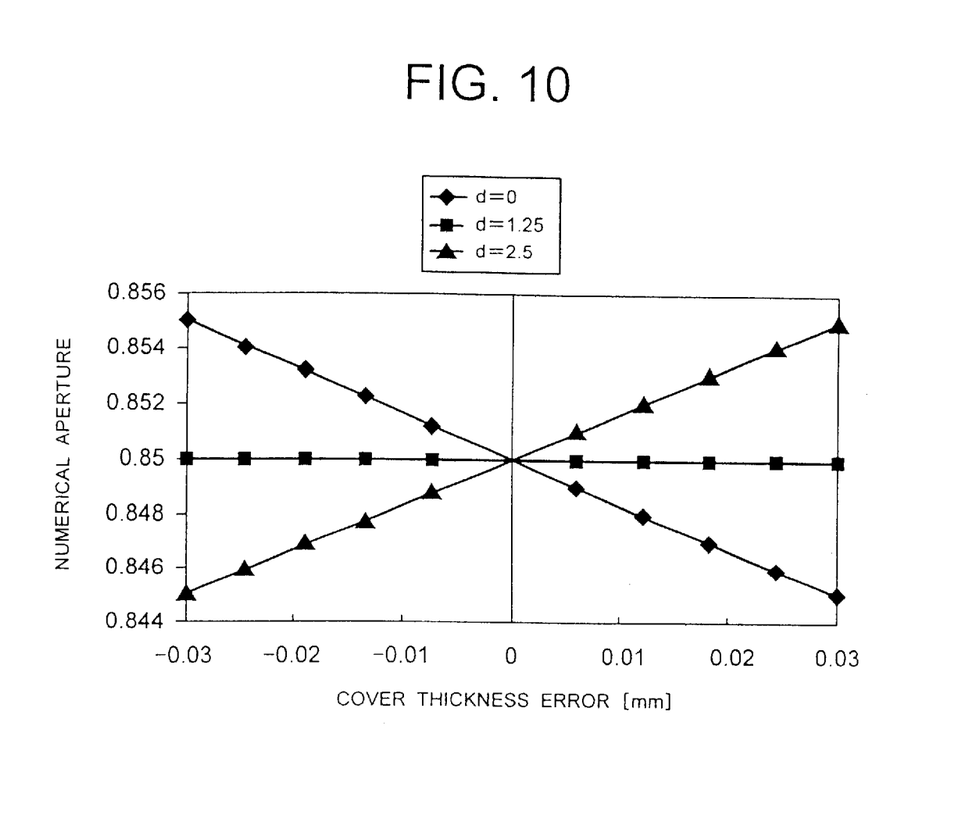
FIG. 10 is a graph showing changes in the numerical aperture of a light beam on a recording layer of the optical disc relative to thickness irregularity in the cover layer of the optical disc.

As shown in FIG. 9, the distance from the vertex of the round surface of the object lens unit 17 on the incident side to the aperture 16 along the optical axis OA of the optical pickup according to the embodiment is referred to as "d". The numerical aperture of the object lens unit 17 is assumed to be 0.85. The relationship between the thickness variations (thickness irregularity or error) of the cover layer of the optical disc 19 from the reference value and the numerical aperture was simulated where the distance d (mm) took three different values (d=0, d=1.25 and d=2.5). d=0 represents the conventional case, and d=1.25 represents the embodiment of the present invention. The results are given in FIG. 10. In the case according to the embodiment of the present invention where d=1.25, the aperture 16 is positioned the approximate focal length Df of the object lens apart from the position of the incidence plane 18 of the object lens unit 17 toward the light source, and the numerical aperture is constant (0.85).

It should be noted that the aperture 16 is not necessarily provided in a lens barrel of the object lens unit 17. For example, if the object lens is driven by an actuator, the aperture 16 may be provided on a bobbin of the actuator, and the object lens may be installed at an appropriate position.

The aperture 16 may be in any form as long as the aperture has an optical opening of a prescribed size. For example, the aperture 16 may be an annular non-transparent member. Alternatively, the aperture 16 may be a circular or square transparent member, a periphery of which is shielded by a tape or painting. The thickness of the aperture 16 may be selected as desired. With a thicker aperture, the precision of keeping the numerical aperture constant may be lowered. However, if the distance Df from the principal incidence plane 18 of the object lens 17 is within the range of the aperture thickness, the same effect as the illustrated embodiment will result.

If the opening diameter of the aperture 16 is smaller than the effective diameter of the object lens 17, the same effect as the illustrated embodiment may be obtained regardless of the numerical aperture. Although the shape of the opening of the aperture 16 is circular in the illustrated embodiment, the shape may be any special shape such as an ellipse, a rectangle and a foursquare.

According to the present invention, since the numerical aperture at a recording layer does not change even if a beam expander in an optical system of an optical pickup compensates for spherical aberration by changing the convergence of a light beam, the constant MTF characteristic can be obtained at each recording layer of a multi-layer recording medium such as a two-layer disc when information is recorded/reproduced.

The present invention may be applied to an optical system using a so-called solid immersion lens whose numerical aperture is more than one.

Figure 11:
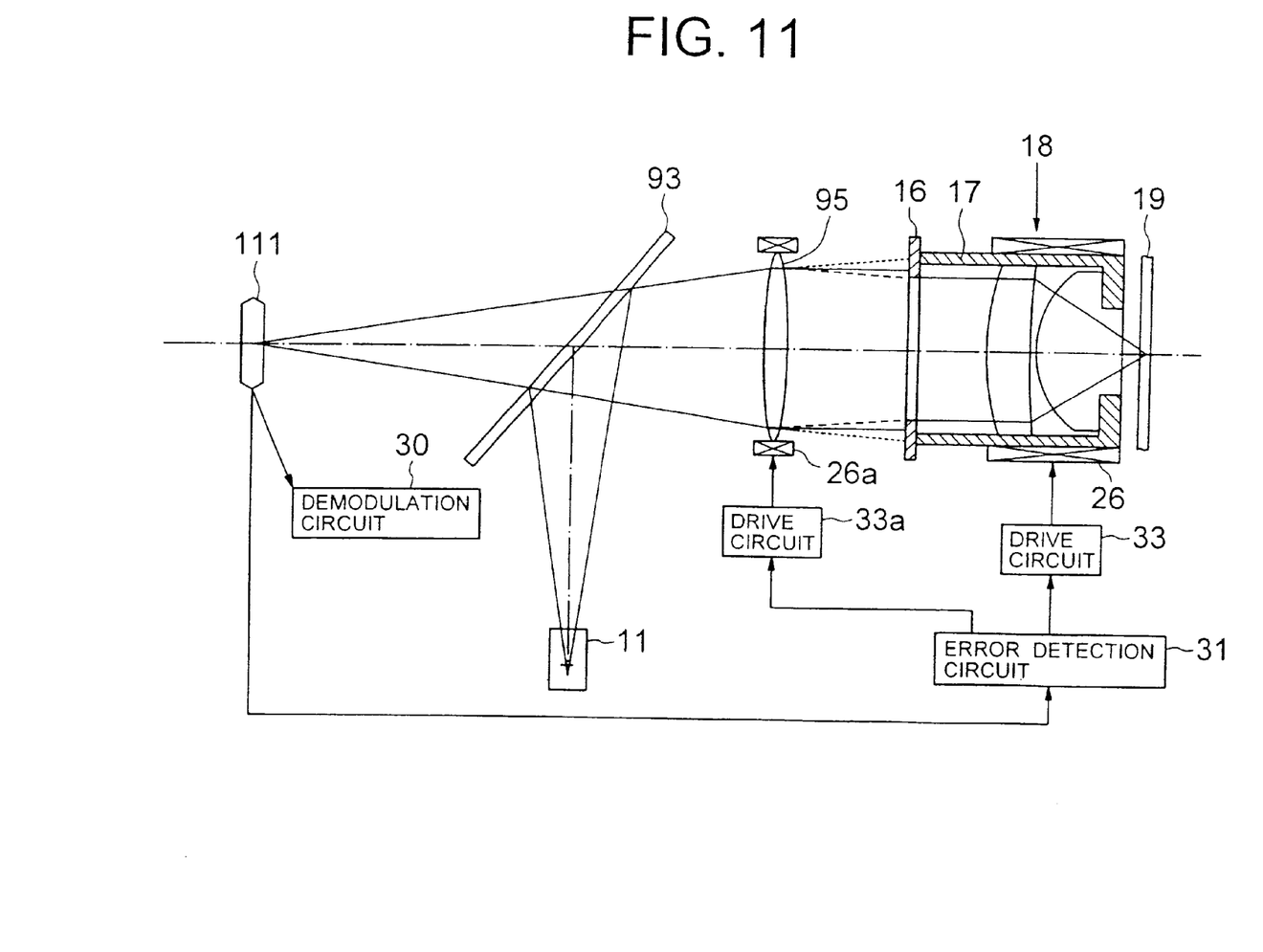
FIG. 11 is a schematic block diagram of an optical system in an optical pickup in an information recording/reproducing apparatus according to another embodiment of the present invention.

In the above described embodiment, the beam expander 22 including two lenses 14 and 15 is used as the spherical aberration correction means. However, the present invention is not limited to use of the beam expander, and other kinds of optical systems capable of varying a condensing position to correct spherical aberration by allowing a parallel beam to have its condensing position changed and to be incident to an object lens maybe employed. As shown in FIG. 11, for example, a so-called finite optical system including a beam splitter (parallel plane plate) 93 and a collimator lens 95 may be employed in the information recording/reproducing apparatus according to the present invention. In FIG. 11, the same reference numerals as those in FIG. 4 denote the same or similar members. In the modified embodiment shown in FIG. 11, the collimator lens 95 is moved along the optical axis to change the spherical aberration. It should be noted, however, that the semiconductor laser 11 may be moved along its optical axis (up and down directions in the drawing) to change the spherical aberration.

According to the present invention, by simply locating an aperture at a particular position, changes in the numerical aperture caused in association with spherical aberration compensation in an information recording medium can be restricted, and changes in the signal recording/reproducing characteristic in association with spherical aberration compensation can be prevented.

This application is based on a Japanese Patent Application No. 2000-369948, and the entire disclosure thereof is incorporated herein by reference.

What is claimed is:

1. An optical pickup for use in an information recording and/or reproducing apparatus, the information recording and/or reproducing apparatus being adapted to record and/or reproduce information upon radiation of a light beam from a light source, the optical pickup comprising:

a condensing optical system for condensing a light beam emitted from a light source onto a recording layer of an information recording medium, the condensing optical system including an object lens and an aperture positioned between the light source and the object lens, wherein the aperture is positioned about a focal length of the object lens apart from a position of a principal incidence plane of the object lens toward the light source along an optical axis of the condensing optical system.

2. The optical pickup according to claim 1, wherein said condensing optical system includes a mechanism with a variable condensing position for converting the light beam to a convergent or divergent light beam to correct spherical aberration and for directing the convergent or divergent light beam to the aperture.

3. The optical pickup according to claim 2, wherein the mechanism includes a beam expander having two lens, and a distance of the two lens is adjustable.

4. The optical pickup according to claim 2, wherein the mechanism includes a beam splitter and a collimator lens.

5. The optical pickup according to claim 1, wherein an effective diameter of the object lens is greater than a diameter of an opening of the aperture.

6. The optical pickup according to claim 1, wherein the object lens includes all lenses between the aperture and the recording medium.

7. The optical pickup according to claim 1, wherein a shape of an opening of the aperture is circular, oval, rectangular or square.

8. The optical pickup according to claim 1, wherein the object lens includes a solid immersion lens.

9. An apparatus for recording and/or reproducing information from a recording medium, comprising:

a light source for emitting a light beam; and an optical pickup including a condensing optical system for condensing the light beam emitted from the light source onto the recording medium, the condensing optical system including an object lens and an aperture positioned between the light source and the object lens, wherein the aperture is positioned about a focal length of the object lens apart from a principal incidence plane of the object lens toward the light source along an optical axis of the condensing optical system.

* * * * *